July 15, 1969   L. SIMONS   3,455,360
VIBRATION-RESISTANT SCREW
Filed July 12, 1967
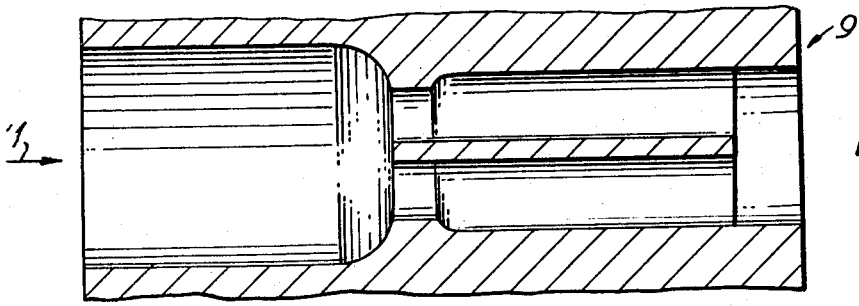
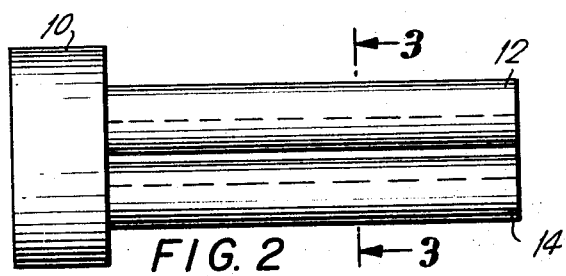
FIG. 2
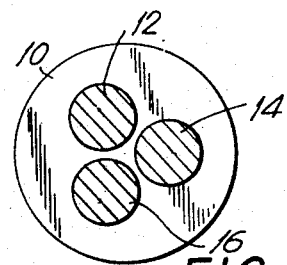
FIG. 3
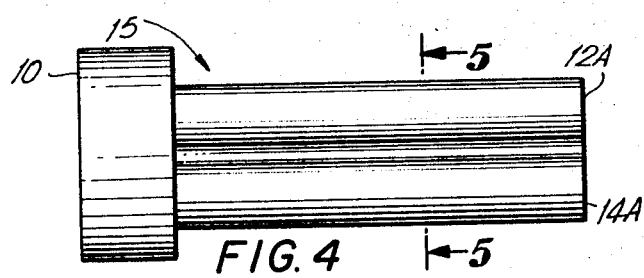
FIG. 4
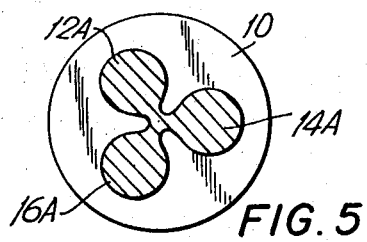
FIG. 5
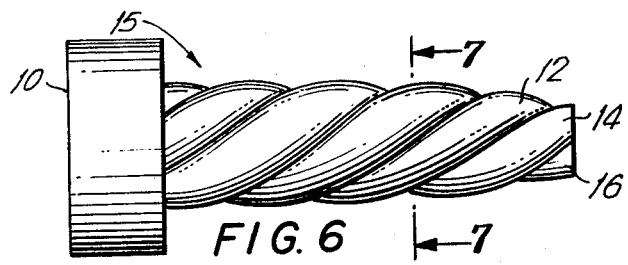
FIG. 6
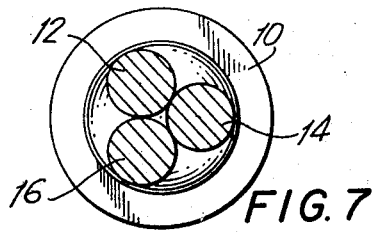
FIG. 7
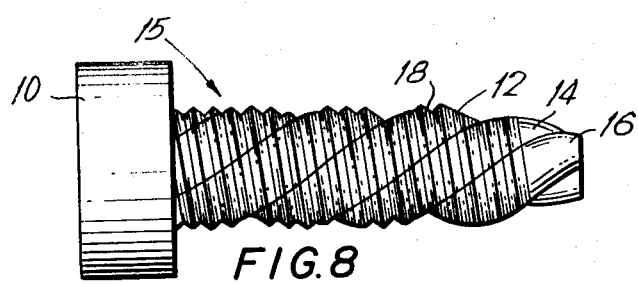
FIG. 8
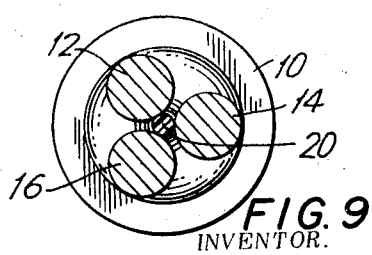
FIG. 9
INVENTOR.
LEON SIMONS
BY
Blum, Moscovitz, Friedman, Blum + Kaplan
ATTORNEYS

United States Patent Office 3,455,360
Patented July 15, 1969

3,455,360
VIBRATION-RESISTANT SCREW
Leon Simons, 374 S. Mountain Road,
New City, N.Y. 10956
Filed July 12, 1967, Ser. No. 652,953
Int. Cl. F16b *39/30, 39/16, 39/34*
U.S. Cl. 151—14     10 Claims

ABSTRACT OF THE DISCLOSURE

A vibration-resistant screw capable of reliably remaining in a threaded bore even under vibratory conditions where conventional screws would become loose. The screw has a head and a shank fixed to and extending from the head and terminating in an end distant from the head. The shank of the screw is provided with an exterior thread enabling the screw to be turned into a body when the shank is turned in a given direction so that the thread of the shank is surrounded and engaged by a thread of the body into which the screw is threaded. A means which forms an integral part of the shank of the screw elastically presses the shank against the surrounding thread of the body into which the screw is threaded so as to reliably maintain the screw threaded into the body. This means, which forms an integral part of the shank, takes the form of a plurality of elongated elastic shank portions situated in side-by-side relation and twisted together in a direction opposite to the thread at the exterior of the shank.

BACKGROUND OF THE INVENTION

This invention relates to screws.

In particular, the invention relates to screws capable of reliably maintaining parts fastened to each other even under conditions where the parts vibrate.

There have been varied and numerous screws designed to resist unthreading or loosening from parts into which they are threaded. A tendency for the fastening to become loose arises from vibrations or deflection of the part which receives the screw. In addition, a major source of loosening of a metal screw in a metal part arises from differences in coefficients of thermal expansion between the screw and the part into which it is threaded, and if these latter conditions are present together with physical vibrations or relatively sharp impact then undesirable loosening or unthreading of the screw takes place.

One of the best known and most widely used solutions to this problem resides in the use of lock washers, although it is also known to use devices such as plastic inserts in the body of the screw to tend to resist loosening thereof. In addition, attempts have been made to provide the screw with a thread which does not match the thread of the tapped hole which receives the screw so that the thread of the screw will become deformed so as to provide a vibration-resistant fastening due to the springiness of the threads. However, this latter construction makes it essential that the tapped bore have a thread of a material harder than that of the screw so that there are serious limitations on this solution to the problem. For example, if this latter solution were to be used in a situation where a screw is threaded into a tapped bore of a plastic body, then the desired results could not be achieved because the plastic will chip since its elastic limit is easily exceeded by the screw, and thus such a solution cannot be used to provide a vibration-resistant screw with plastics.

Furthermore, the known screws are not always capable of acting as self-tapping screws as well as vibration-resistant screws. For example, in the above case where the thread of the screw is designed to be deformed, it cannot act as a self-tapping screw. In the case where a plastic insert is used, this insert would become abraided or cut away during the tapping operation. While it is possible to use a lock washer with a self-tapping screw, this assembly requires an extra operation to bring about the assembly of the components as well as the possibility of inadvertently omitting the lock washer. Furthermore, this latter type of construction makes in essential that the screw be driven all the way into the tapped bore in order to compress the lock washer. Where such constructions are used with plastics, there will be unavoidable failure because the plastic cannot withstand the forces which are exerted under these conditions. Furthermore, with such construction after the screw has been threaded into and unthreaded from the tapped bore a number of times the lock washer loses its elasticity and the vibration-resistant characteristics cannot be reliably maintained.

SUMMARY OF THE INVENTION

It is thus a primary object of the present invention to provide a screw which avoids the above drawbacks.

In particular, it is an object of the invention to provide a screw which requires no separate washers or other components and where instead the vibration-resistant characteristic of the screw is derived from its own integral construction.

Another object of the present invention is to provide a screw which will have elastic properties provided in a predetermined degree determined by the particular requirements.

Also, it is an object of the invention to provide a screw which is self-tapping while at the same time remaining reliably in the tapped bore due to the springy characteristics of the screw which resist unthreading thereof.

Moreover, it is an object of the invention to provide a screw which will not only reliably remain in a tapped bore due to the springiness of the screw but which will in addition increase the pressure with which the screw engages a thread which surrounds the screw upon any tendency of the screw to become unthreaded from the tapped bore in which it is situated.

In accordance with the invention the screw has a head and an elongated shank fixed to and extending from the head and terminating in an end which is distant from the head of the screw. This shank is provided at its exterior with a thread enabling the shank to be received in a bore of a given body when turned in a given direction. Thus, the thread at the exterior of the shank will be surrounded and engaged by the thread of the body which receives the shank. In accordance with the invention a means which forms an integral part of the shank elastically presses the latter against the surrounding thread of the body so as to reliably maintain the screw in the body in a vibration-resistant manner. This means includes a plurality of elongated elastic shank portions which are situated in side-by-side relation with each shank portion extending from the head of the screw to the end of the shank distant therefrom, and these elongated elastic shank portions are twisted together in a direction opposite to the thread at the exterior of the shank.

The plurality of elongated shank portions may take the form of three separate wires or three elongated shank portions which are integral with a central elongated shank portion and which have a lobular cross section with respect to the central shank portion. When this screw of the invention is threaded into a body, the plurality of shank portions wrap themselves with increasing tightness about each other, thus forming in effect a one-piece shank, and thus the means which is integral with the shank responds to turning thereof into a body to tend to compress the shank and decrease the pressure with which it engages the body thread which surrounds the thread of the shank. During unthreading, or during a tendency to become unthreaded, the plurality of shank portions tends to unwrap or become untwisted, thus pressing to an even greater degree against the surface of the surrounding thread, so that the means of the invention responds to any tendency of the screw to become unthreaded by automatically exerting a greater frictional pressure against the surface of the surrounding thread, thus resisting loosening of the screw.

When the screw is manufactured, the elongated shank portions thereof extend parallel to the central axis of the screw, and then during a subsequent step in the manufacture of the screw the shank portions are twisted together.

Thus, instead of forming a screw from a shank body which consists of a single wire, as is conventional, with the invention the shank includes a plurality of elongated elastic portions which may take the form of separate and distinct wires instead of a single wire body, or the several elongated shank portions, which may be three in number, may be integral with a central shank portion while the outer elongated elastic shank portions have a lobular cross section.

In order to provide different degrees of elasticity for the shank of the screw of the invention, as may be required for different specific uses of the screw, such as when the screw is used with plastics or with high-temperature alloys, in which case a high degree of elasticity may be required, the pitch of the twisted shank portions may be varied, or the shapes of the lobular cross sections may be varied in the case where the elastic shank portions are integral with the central shank portion. Furthermore, in the case where the shank is composed of a plurality of separate and distinct elongated wires, an additional wire or rod of nylon or a springy plastic may be inserted centrally between the elastic outer shank portions, extending coaxially along the central axis of the screw with the outer elastic shank portions twisted about this central wire or rod. Thus, in this way there are several possible degrees of elasticity which can be achieved with the screw of the invention.

There are numerous situations where the screw of the invention can be used with advantage. Thus, in aerospace applications where temperature changes are abrupt, the screw of the invention will actually "breathe" while automatically accommodating itself to change in dimensions resulting from thermal expansion and contraction, thus avoiding any possible loosening resulting from dimension changes due to coefficients of thermal expansion.

A further advantage derived from the screw of the invention resides in the fact that when it is threaded into a body the twisted shank portions tend to become twisted more tightly upon each other so as to reduce the pressure with which the screw presses against the surrounding thread, thus facilitating threading of the screw into a body and in particular facilitating self-tapping operations where in addition to the reduction in pressure with respect to the surrounding thread the greater pressure of the twisted shank portions against each other provide a shank of greater solidity and rigidity. Moreover, in spite of this self-tapping action which can be very efficiently achieved with the screw of the invention, it is fully vibration-resistant due to the tendency of the shank portions to elastically untwist themseves from each other in response to any loosening tendency. Therefore both the feature of self-tapping and the feature of reliable maintenance of the fastening are present in the single screw of the invention.

Inasmuch as the screw of the invention is capable of tapping itself into plastic as well as metal bodies, it will be fully vibration-resistant even in plastic material, and there is no danger of cracking of the plastic material with the screw of the invention.

Furthermore, because of the possibility of varying the elasticity by any of the measures referred to above, the degree of resistance to loosening can be predetermined, so that it becomes possible to manufacture the screws of the invention so that they will require a minimum amount of torque to become threaded into a body while at the same time possessing maximum resistance to loosening as a result of the springy nature of the shank of the screw of the invention, these results being achieved for example by the degree of tightness with which the shank portions are twisted together, the particular configuration in cross section of the lobes where the lobular type of construction is provided, or by providing suitable heat-treatment and tempering of the shank portions. Also, it is possible to achieve this result by inserting a suitable rod or wire about which the shank portions are twisted, as pointed out above.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a fragmentary longitudinal sectional elevation of an extrusion die which may be used in the manufacture of the screw of the invention, the section of FIG. 1 being taken in a plane which contains the axis of the extrusion die;

FIG. 2 is a side elevation of one possible embodiment of a screw of the invention at an intermediate stage in the manufacture thereof;

FIG. 3 is a transverse section of the structure of FIG. 2 taken along line 3—3 of FIG. 2 in the direction of the arrows;

FIG. 4 is a side elevation of another embodiment of a screw of the invention at an intermediate stage in the manufacture thereof;

FIG. 5 is a transverse section of the structure of FIG. 4 taken along line 5—5 of FIG. 4 in the direction of the arrow;

FIG. 6 is a side elevation of a stage in the manufacture of a screw from the structure shown in FIG. 2 subsequent to the stage shown in FIG. 2 but before the screw has been completed;

FIG. 7 is a transverse section of the structure of FIG. 6 taken along line 7—7 of FIG. 6 in the direction of the arrows;

FIG. 8 shows in side elevation a completed screw of the invention, this screw having prior to completion thereof the structures respectively illustrated in FIGS. 2 and 6; and FIG. 9 is a transverse section of another embodiment of a screw of the invention.

DESCRIPTION OF THE PREFERRED EMBODIMENTS

Referring to FIG. 1, there is shown therein an extrusion die 9 which may be used in the manufacture of the screw of the invention. Stock which is suitable for extrusion is inserted into the die and compressed therein with a force acting thereon in the direction of the arrow 11 shown in FIG. 1, and in this way the die will form from the stock a head and independent, separate and distinct shank portions in the form of extruded wire elements integral with and extending from the head.

Thus, with such structure it is possible to achieve the structure shown in FIGS. 2 and 3. This latter structure includes the head 10 of the screw, which is shown in its finished condition in FIGS. 2 and 3, as well as the elongated elastic wire shank portions 12, 14, and 16 which are uniformly distributed about and extend parallel to the axis of the screw. The head 10 of the screw may have dimensions substantially the same as that of the cross section of the blank which is fed to the extruder, but after extrusion the head is finished so as to have the cylindrical configuration illustrated, and then this head may be provided at its outer end face with a suitable groove, for example, capable of receiving the tip of a screwdriver, for example.

Instead of utilizing a die as shown in FIG. 1 according to which separate and distinct shank portions 12, 14 and 16 are provided, it is possible to provide the extrusion die with an orifice which will provide the shank portions shown in FIGS. 4 and 5. This construction differs from that of FIGS. 2 and 3 only in that the shank portions 12A, 14A and 16A are all integral with a central elongated shank portion which extends along the axis of the screw, so that in this way the shank portions have the lobular cross sectional configuration clearly apparent from FIG. 5. It will be noted from FIG. 3 that with the embodiment of FIGS. 2 and 3 the separate and independent wire shank portions are of circular cross section.

These shank portions, whether having the construction of FIGS. 2 and 3 or that of FIGS. 4 and 5, form the shank 15 which is then twisted so as to have the construction shown in FIGS. 6 and 7. This construction is provided from the embodiment of FIGS. 2 and 3, but it will be understood that the embodiment of FIGS. 4 and 5 will provide a similar construction which will achieve the same results. Thus, the several shank portions 12, 14, and 16 are twisted together so as to form the tapered shank 15 which is visible in FIG. 6. As may be seen from FIG. 7, and particularly by a comparison of the latter with FIG. 3, at the region of the head 10 the shank portions are spaced from each other, as shown in FIG. 3, whereas by twisting them together, as well as by stretching them if desired, the separate and distinct wire shank portions 12, 14 and 16 are brought into engagement with each other and twisted so as to provide the tapered shank structure shown in FIG. 6, this shank still being integral with the head 10 and terminating in a free end distant therefrom.

It is to be noted that in the particular example illustrated the shank portions are twisted in a left-hand direction, so as to form, in effect, a left-hand thread. This shank 15, which thus has the structure shown in FIGS. 6 and 7, is then provided with an exterior thread 18 which can be formed on the shank in any known manner as by being rolled thereon with a known thread-forming tool. In this case where the shank portions were twisted in a left-hand direction, the thread 18 is a right-hand thread, so that the shank portions are twisted oppositely to the exterior thread of the screw. With the screw of the invention the shank portions are invariably twisted oppositely to the exterior screw thread.

Thus, with this construction when the screw of the invention is threaded into a body, the twisted shank portions will tend to become more tightly twisted against each other so that the rigidity of the shank 15 is increased at this time and the tendency for the exterior surfaces of the twisted shank portions to resiliently press against the surrounding screw thread is reduced. However, as soon as the operation of threading the screw into a body is terminated, the twisted shank portions will tend to become untwisted and spring apart from each other, thus pressing against the surrounding screw thread and reliably maintaining the screw of the invention in the threaded bore in a vibration-resistant manner. Furthermore, any tendency for the screw to become unthreaded, or in fact any positive unthreading of the screw, will result in a further tendency for the shank portions so become untwisted, so that under these conditions they will press with an even greater frictional pressure against the surface of the surrounding thread, so that with the screw of the invention the elastic means which forms an integral part of the shank responds automatically to maintain the screw in the threaded bore, to resist unthreading thereof, and even to reduce the frictional engagement with the surrounding thread during threading of the screw into the bore. It is to be noted that these characteristics of the screw of the invention are particularly effective when the screw is used with plastic materials, so that the vibration-resistant character of the screw is maintained even with materials of this latter type.

The degree of resiliency which the elastic wire shank portions 12, 14, and 16 possess may be selected by controlling the degree of twist as well as by applying different degrees of heat treatment so as to temper the shank portions to an extent which will achieve the desired degree of resiliency.

In addition, it is possible to use a construction as shown in FIG. 9 where the separate and distinct shank portions 12, 14, and 16 surround a central resilient elongated rod or wire 20 which may be made of a plastic such as nylon or of a metal and which is situated coaxially along the shank prior to twisting of the portions 12, 14 and 16 thereof. Because of the resiliency of the central rod 20 of this embodiment, a further degree of torsional as well as transverse resiliency is imparted to the shank. This construction is of particular advantage when the screw of the invention is used with the plastic materials.

Although in the examples illustrated in the drawings the shank is composed of three elongated wire portions which form at least part of the means which is integral with the shank for resiliently pressing the latter against the surrounding thread, it is apparent that any number of elongated shank potrions having any desired cross sectional configuration may be used.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A vibration-resistant screw comprising, a head, a shank fixed to and extending from said head and terminating in an end distant therefrom, said shank having at its exterior a thread enabling the screw to be threaded into a body in response to turning of said shank in a given direction so that when the screw is thus threaded into the body and thread at the exterior of the shank is surrounded and engaged by a thread of the body, and means forming an integral part of said shank for elastically pressing the latter radially against the thread of the body to reliably maintain the screw threaded into the latter said means including elongated elastic shank portions each extending between said head and said end of said shank, said shank portions being situated in side-by-side relation and being twisted together in a direction opposite to said thread at the exterior of said shank.

2. A screw as recited in claim 1 and wherein said means responds to any tendency of said shank to turn in a direction opposite to said given direction for urging said shank to increase its cross-sectional area and to press with an increasing force radially against the surrounding thread of the body.

3. A screw as recited in claim 2 and wherein said means automatically responds to turning said shank in said given direction for tending to reduce the cross-sectional area of said shank and thus the radial pressure thereof against the surrounding thread of the body.

4. A screw as recited in claim 1 and wherein said shank portions are separate from each other.

5. A screw as recited in claim 1 and wherein said means includes a central shank portion integral with the remainder of said elongated elastic shank portions and the latter having a lobular cross section with respect to said integral central shank portion.

6. A screw as recited in claim 1 and wherein said means includes a central rod separate from and surrounded by the twisted shank portions.

7. A screw as recited in claim 6 and wherein said rod is plastic and said remaining shank portions are in the form of metal wires.

8. A screw as recited in claim 1 and wherein there are three elongated shank portions uniformly distributed about a central axis of said shank.

9. A screw as recited in claim 8 and wherein said shank portions are in the form of elongated wires of circular cross section.

10. A screw as recited in claim 9 and wherein said shank tapers from said head to said end of said shank distant from said head.

References Cited

UNITED STATES PATENTS

| | | | |
|---|---|---|---|
| 701,019 | 5/1902 | Diescher | 85—1 |
| 1,708,793 | 4/1929 | Jones | 85—1 |
| 1,756,973 | 5/1930 | Conner | 85—1 |
| 2,978,860 | 4/1961 | Campbell | 85—1 |

FOREIGN PATENTS 958,192    9/1949    France.

EDWARD C. ALLEN, Primary Examiner

U.S. Cl. X.R.

10—10; 29—505; 85—1